(12) United States Patent
Doering et al.

(10) Patent No.: US 10,232,841 B2
(45) Date of Patent: Mar. 19, 2019

(54) METHODS AND SYSTEM FOR IMPROVING RESPONSE OF A HYBRID VEHICLE

(71) Applicant: Ford Global Technologies, LLC, Dearborn, MI (US)

(72) Inventors: Jeffrey Allen Doering, Canton, MI (US); Gregory Patrick McConville, Ann Arbor, MI (US); Chris Paul Glugla, Macomb, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 53 days.

(21) Appl. No.: 15/356,449

(22) Filed: Nov. 18, 2016

(65) Prior Publication Data

US 2018/0141538 A1 May 24, 2018

(51) Int. Cl.
*B60K 6/48* (2007.10)
*B60K 6/50* (2007.10)
(Continued)

(52) U.S. Cl.
CPC ............ *B60W 20/15* (2016.01); *B60K 6/365* (2013.01); *B60K 6/387* (2013.01); *B60K 6/48* (2013.01); *B60K 6/485* (2013.01); *B60K 6/50* (2013.01); *B60W 20/10* (2013.01); *B60W 30/18127* (2013.01); *B60W 50/082* (2013.01); *F02D 11/105* (2013.01); *F02D 13/04* (2013.01); *F02D 13/06* (2013.01); *F02D 29/02* (2013.01); *F02D 41/0087* (2013.01); *F02D 41/042* (2013.01); *F02D 41/123* (2013.01); *F02D 41/26* (2013.01); *B60K 2006/4825* (2013.01); *B60W 2030/1809* (2013.01); *B60W 2030/18081* (2013.01); *B60W 2540/10* (2013.01); *B60W 2710/06* (2013.01); *B60Y 2200/92* (2013.01); *B60Y 2300/18108* (2013.01); *B60Y 2300/18125* (2013.01); *B60Y 2300/18133* (2013.01); *B60Y 2300/435* (2013.01); *B60Y 2300/437* (2013.01);
(Continued)

(58) Field of Classification Search
CPC ...... B60W 20/15; B60K 6/387; F02D 11/105; F02D 13/04; F02D 41/0087; F02D 41/042; F02D 41/123; F02D 41/26; F02D 2200/501; F02D 2200/606; B60Y 2200/92; B60Y 2300/18108; B60Y 2300/435; B60Y 2300/437; B60Y 2400/42; Y10S 903/909; Y10S 903/914; Y10S 903/915
See application file for complete search history.

(56) References Cited

U.S. PATENT DOCUMENTS 7,104,347 B2 * 9/2006 Severinsky ............ B60H 1/004
180/65.23
7,503,873 B2 3/2009 Nakajima et al.
(Continued)

*Primary Examiner* — Jean Paul Cass
(74) *Attorney, Agent, or Firm* — Julia Voutyras; McCoy Russell LLP

(57) ABSTRACT

Systems and methods for operating a driveline of a hybrid vehicle are disclosed. In one example, an engine may enter or stay in one of two cylinder modes in response to a request to a negative torque capacity of an electric machine being insufficient to provide a desired driveline braking torque. One cylinder mode operates cylinders with cylinder valves held closed and without fuel being injected to the cylinders while the other cylinder mode operates cylinders with valves that open and close without fuel being injected to the cylinders.

16 Claims, 7 Drawing Sheets

(51) Int. Cl.

| | | |
|---|---|---|
| *B60K 6/365* | (2007.10) | |
| *B60K 6/387* | (2007.10) | |
| *B60K 6/485* | (2007.10) | |
| *B60W 20/10* | (2016.01) | |
| *B60W 20/15* | (2016.01) | |
| *B60W 30/18* | (2012.01) | |
| *B60W 50/08* | (2012.01) | |
| *F02D 11/10* | (2006.01) | |
| *F02D 13/04* | (2006.01) | |
| *F02D 13/06* | (2006.01) | |
| *F02D 29/02* | (2006.01) | |
| *F02D 41/00* | (2006.01) | |
| *F02D 41/04* | (2006.01) | |
| *F02D 41/12* | (2006.01) | |
| *F02D 41/26* | (2006.01) | |

(52) U.S. Cl.
CPC ..... *B60Y 2400/42* (2013.01); *F02D 2200/501* (2013.01); *F02D 2200/606* (2013.01); *Y10S 903/909* (2013.01); *Y10S 903/914* (2013.01); *Y10S 903/915* (2013.01)

(56) References Cited

U.S. PATENT DOCUMENTS

| | | | |
|---|---|---|---|
| 9,493,168 B1* | 11/2016 | Kim | B60W 50/06 |
| 9,702,309 B2* | 7/2017 | Haynes | F02D 41/0087 |
| 9,777,656 B1* | 10/2017 | Bowman | F02D 13/04 |
| 9,869,242 B2* | 1/2018 | Leone | F01N 3/20 |
| 10,024,256 B2* | 7/2018 | Richards | F02D 13/06 |
| 10,106,150 B2* | 10/2018 | Ortmann | B60W 20/40 |
| 2002/0112903 A1 | 8/2002 | Wakashiro et al. | |
| 2002/0157623 A1* | 10/2002 | Turner | F01L 9/02 |
| | | | 123/90.12 |
| 2003/0054919 A1 | 3/2003 | Matsubara et al. | |
| 2004/0163866 A1 | 8/2004 | Sen et al. | |
| 2004/0182340 A1* | 9/2004 | Cecur | F01L 1/185 |
| | | | 123/90.16 |
| 2005/0205056 A1* | 9/2005 | Lewis | F01L 13/0005 |
| | | | 123/348 |
| 2005/0279323 A1* | 12/2005 | Lewis | F01L 13/0005 |
| | | | 123/321 |
| 2007/0204816 A1* | 9/2007 | Russell | F01L 13/04 |
| | | | 123/90.12 |
| 2007/0204817 A1* | 9/2007 | Russell | B60K 6/12 |
| | | | 123/90.12 |
| 2007/0209618 A1* | 9/2007 | Leone | B60K 6/24 |
| | | | 123/90.12 |
| 2007/0209619 A1* | 9/2007 | Leone | B60W 10/06 |
| | | | 123/90.12 |
| 2012/0017578 A1* | 1/2012 | Johnson | F15B 1/165 |
| | | | 60/330 |
| 2014/0039778 A1* | 2/2014 | Kerns | F02D 41/0087 |
| | | | 701/103 |
| 2015/0191168 A1* | 7/2015 | Mitsuyasu | B60W 20/00 |
| | | | 701/54 |
| 2015/0232103 A1* | 8/2015 | Phillips | B60W 30/20 |
| | | | 477/168 |
| 2016/0146121 A1* | 5/2016 | Carlson | F02D 17/02 |
| | | | 60/276 |
| 2017/0355374 A1* | 12/2017 | Glugla | B60W 10/06 |
| 2017/0356353 A1* | 12/2017 | Rollinger | F02D 13/06 |
| 2017/0356355 A1* | 12/2017 | Rollinger | F02B 37/16 |
| 2017/0356358 A1* | 12/2017 | Richards | F02D 9/02 |
| 2017/0356364 A1* | 12/2017 | Glugla | F02D 41/0087 |
| 2017/0356366 A1* | 12/2017 | Glugla | F02D 41/0087 |
| 2017/0356367 A1* | 12/2017 | Glugla | F02D 17/02 |
| 2017/0356368 A1* | 12/2017 | Richards | F02D 41/0087 |
| 2017/0356369 A1* | 12/2017 | Doering | F02D 41/1406 |
| 2017/0356370 A1* | 12/2017 | Doering | F02D 13/06 |
| 2017/0356371 A1* | 12/2017 | Rollinger | F02D 41/0087 |
| 2017/0356372 A1* | 12/2017 | Richards | F02D 13/06 |
| 2017/0356373 A1* | 12/2017 | Willard | F02D 41/0087 |
| 2017/0356374 A1* | 12/2017 | Rollinger | F01L 13/0005 |
| 2017/0356375 A1* | 12/2017 | Glugla | F02D 41/0087 |
| 2017/0356381 A1* | 12/2017 | Richards | F02D 41/3094 |
| 2018/0134272 A1* | 5/2018 | Doering | B60W 20/10 |
| 2018/0141538 A1* | 5/2018 | Doering | F02D 11/105 |
| 2018/0223757 A1* | 8/2018 | McCarthy, Jr. | F02D 41/0245 |

* cited by examiner

METHODS AND SYSTEM FOR IMPROVING RESPONSE OF A HYBRID VEHICLE

FIELD

The present description relates to methods and a system for operating a hybrid powertrain that includes an engine and an electric machine to propel a vehicle. The methods and systems may be particularly useful for hybrid vehicles that include cylinders that may be deactivated.

BACKGROUND AND SUMMARY

A hybrid vehicle may include an engine and a motor for propelling the vehicle. The engine may be stopped and not rotating when driver demand torque may be met via the motor. Stopping the engine may conserve fuel and reduce vehicle emissions. However, if a human driver requests a large increase in driveline torque output, the engine may have to be restarted to meet the driver demand torque. The driver may notice that maximum driveline torque is not available until after the engine starts and achieves a speed of the driveline. The engine may take more than one or two seconds to start and achieve a speed where it may contribute torque to the driveline. Consequently, the driver and vehicle passengers may notice a delay in torque provided to the driveline. The delay in torque production may be objectionable.

The inventor herein has recognized the above-mentioned issues and has developed a driveline operating method, comprising: ceasing fuel delivery to all engine cylinders and adjusting an actual total number of cylinders of an engine with operating poppet valves and an actual total number of cylinders of the engine with deactivated poppet valves in response to a desired driveline braking torque during vehicle deceleration via a controller.

By operating different engine cylinders in different valve modes while fuel is not injected to an engine during vehicle deceleration, it may be possible to provide driveline braking while improving a driveline's capability to provide torque in response to a request to increase engine torque after combustion in engine cylinders ceases. For example, if a small amount of driveline braking is requested and an electric machine has capacity to provide the desired driveline braking, an engine may be rotated with valves held closed to reduce engine pumping losses. Keeping the engine rotating may reduce engine starting time by not having to accelerate the engine from zero speed to a speed of the driveline before torque may be provided by the engine to the driveline. If a larger amount of driveline brake torque is requested, engine cylinders may be operated with valves that open and close so that the desired driveline braking may be provided by the engine and the electric machine while still not injecting fuel to the engine.

The present description may provide several advantages. For example, the approach may reduce engine starting time. Further, the approach may reduce driveline response time to a request to increase driveline torque. Additionally, the approach may improve vehicle fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
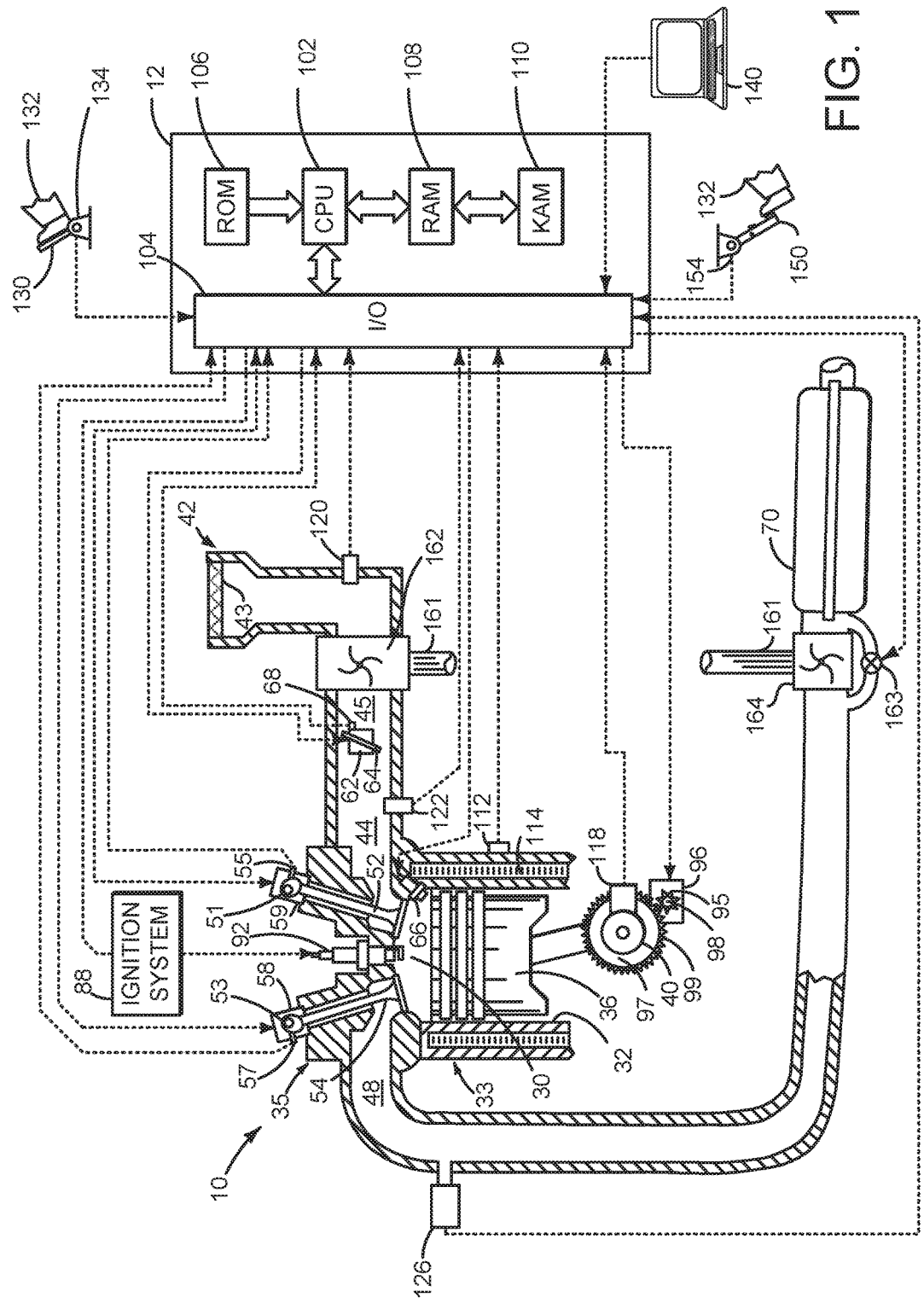
FIG. 1 is a schematic diagram of an engine.
Figure 2A:
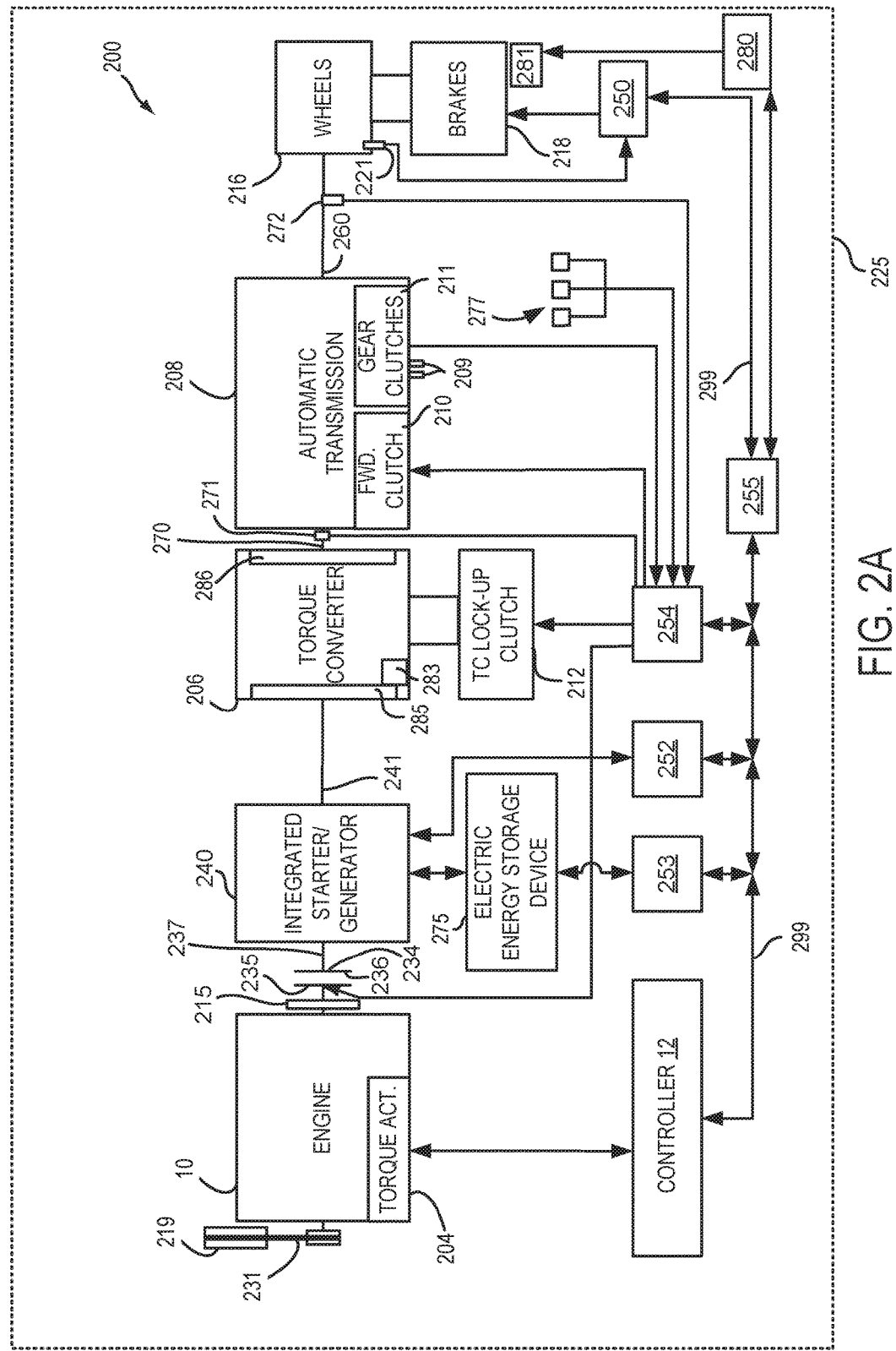
FIGS. 2A, 2B, and 2C are schematic diagrams of three example hybrid vehicle driveline.
Figure 2B:
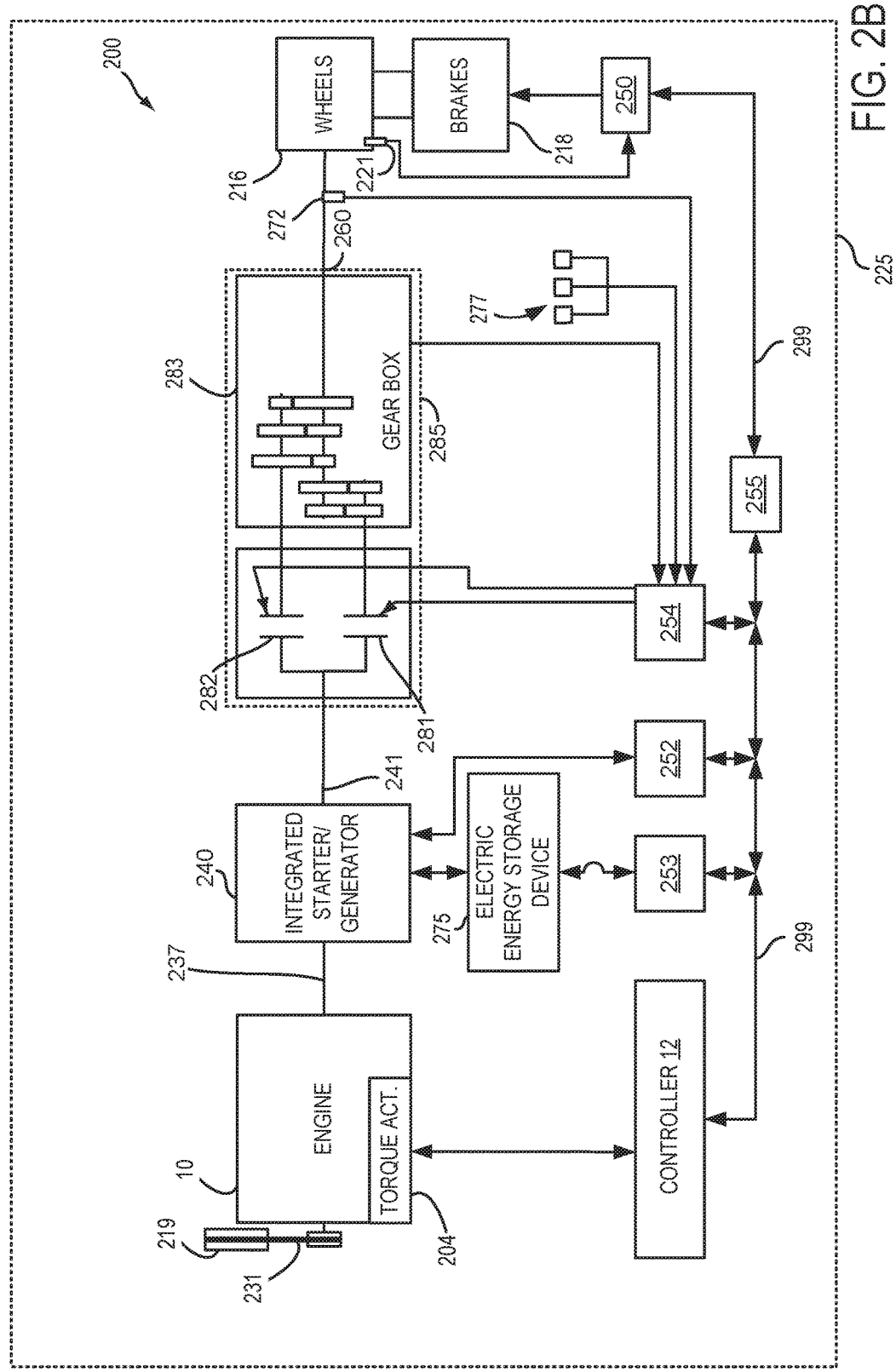
Figure 2C:
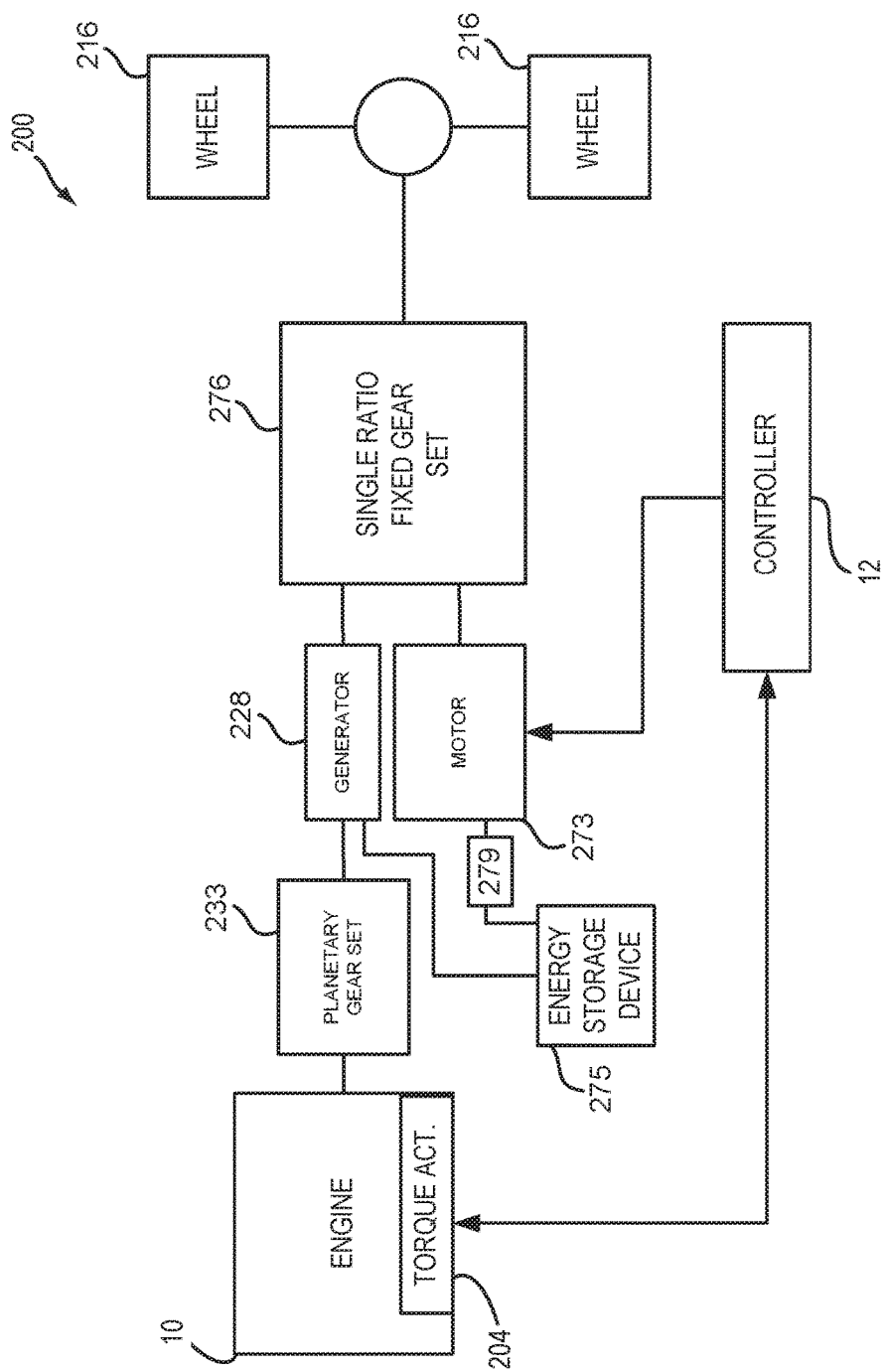
Figure 3A:
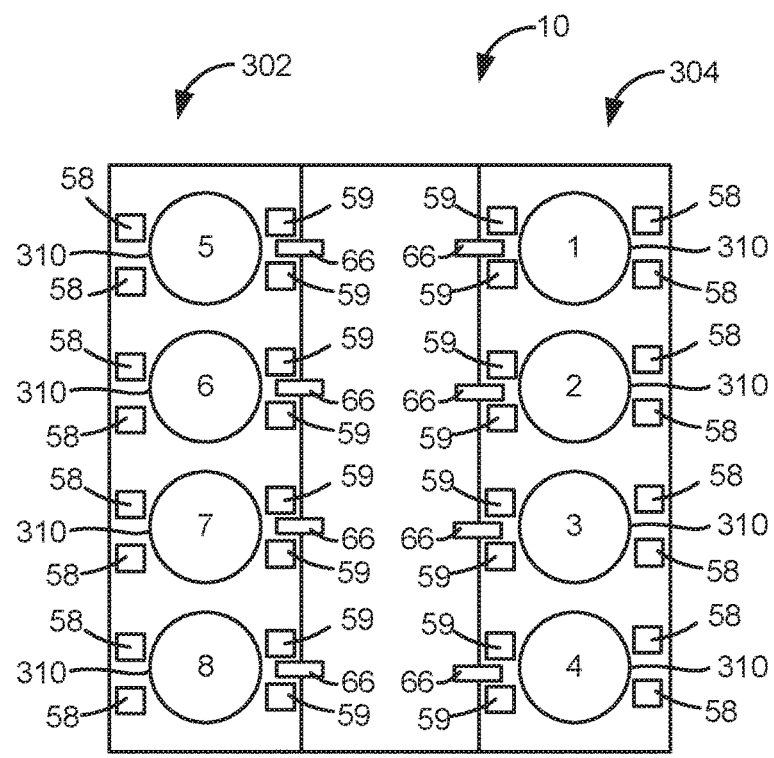
FIGS. 3A and 3B show example engines with deactivating valves.
Figure 3B:
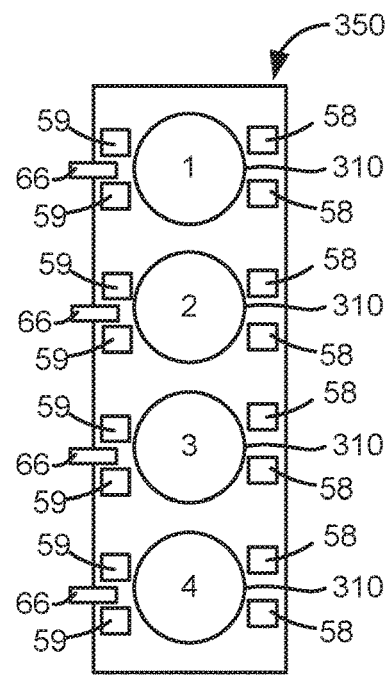

The present description is related to controlling driveline operation of a hybrid vehicle. The hybrid vehicle may include an internal combustion engine as shown in FIG. 1. The internal combustion engine may be included in a driveline or powertrain of a hybrid vehicle as shown in FIGS. 2A-2C. The engine may also include deactivating cylinders and deactivating poppet valves as shown in FIGS. 3A and 3B. The hybrid driveline or powertrain may operate as shown in the operating sequence of FIG. 4. The hybrid vehicle may operate according to the method of FIG. 5.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive human driver input from input device 140. Input device 140 may include a display panel and keyboard or virtual keyboard. A human may input requests for vehicle driving mode via input device 140.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2A is a block diagram of a vehicle 225 including a powertrain or driveline 200. The powertrain of FIG. 2A includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2A. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. Engine 10 may be started with an engine starting system shown in FIG. 1, via belt driven integrated starter/generator (BISG) 219, or via driveline integrated starter/generator (ISG) 240 also known as a motor/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53). BISG may operate as a motor when supplied with electrical power via electric energy storage device 275. BISG may operate as a generator supplying electrical power to electric energy storage device 275.

An engine output torque may be transmitted to an input or first side of powertrain disconnect clutch 235 through flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 235. ISG 240 may provide a positive torque or a negative torque to powertrain 200 via operating as a motor or generator as instructed by electric machine controller 252.

Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

Vehicle system controller 255 may also communicate vehicle suspension settings to suspension controller 280. The suspension of vehicle 225 may be adjusted to critically damp, over damp, or under damp the vehicle suspension via variable dampeners 281.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG 240 or BISG 219. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and/or engine 10, and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Engine 10 may also provide a negative torque by ceasing fuel delivery to engine cylinders. Engine cylinders may be deactivated with intake and exhaust valves opening and closing during engine rotation or with intake and exhaust valves held closed over one or more engine cycles while the engine rotates. Any portion of desired negative wheel torque that may not be provided by engine 10 and/or ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Referring now to FIG. 2B, an alternative driveline or powertrain 200 is shown. The driveline of FIG. 2B includes many of the same components as shown in FIG. 2A. Components in FIG. 2B having the same numerical values as components shown in FIG. 2A are the same components. Further, same components operate in a same way. Therefore, for the sake of brevity, descriptions of similar components may be omitted.

Driveline 200 includes engine 10 mechanically coupled to ISG 240 via shaft 237. ISG 240 is mechanically coupled to dual clutch transmission (DCT) 285 via shaft 241. DTC 285 includes a first clutch 281, second clutch 282, and gearbox 283. DCT 285 outputs torque to shaft 260 to supply torque to vehicle wheels 216. Transmission controller selectively opens and closes first clutch 281 and second clutch 282 to shift DCT 285.

Referring now to FIG. 2C, an example of an alternative driveline 200 is shown. The driveline of FIG. 2C includes many of the same components as shown in FIG. 2A. Components in FIG. 2C having the same numerical values as components shown in FIG. 2A are the same components. Driveline 200 includes engine 10 and torque actuator 204 as described in FIG. 1. Engine 10 provides torque to planetary gear set 233 and generator 228 operates in a speed control mode to control engine torque delivery to single ratio gearing system 276. Output from generator 228 provides electrical energy to energy storage device 275 and motor 273. Electrical energy storage device 275 may supply electrical power to motor 273 via variable voltage controller 279 when engine 10 is not operating. Electrical energy storage device may be a battery, capacitor, or other electrical energy storage device. Motor 273 may also be operated in a generator mode for regenerative braking. Torque from engine 10 and motor 273 may be combined in single ratio gearing system 276 to provide torque to vehicle wheels 216 via a mechanical power path. Controller 12 controls operation of engine 10, generator 228, and motor 273 to adjust power supplied to vehicle wheels 216. Thus, the driveline of FIG. 2C does not include a transmission with multiple fixed gear ratios for delivering engine and motor power to vehicle wheels.

Referring now to FIG. 3A, an example multi-cylinder engine 10 showing deactivating intake and exhaust valve actuators is shown. The engine includes cylinders and associated components as shown in FIG. 1. Engine 10 includes eight cylinders 310. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively deactivated to improve engine fuel economy when less than the engine's full torque capacity is requested. Further, intake and exhaust valves of selected cylinders may be deactivated to change engine pumping characteristics. For example, cylinders 2, 3, 5, and 8 (e.g., a fixed pattern of deactivated cylinders) may be deactivated during an engine cycle (e.g., two revolutions for a four stroke engine) and may be deactivated for a plurality of engine cycles while engine speed and load are constant or very slightly. During a different engine cycle, a second fixed pattern of cylinders 1, 4, 6, and 7 may be deactivated. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle.

Engine 10 may also include deactivating valve actuators 58 and 59. The deactivating valve actuators make it possible to control whether air is inducted into each individual cylinder on a cycle by cycle basis. During some engine cycles when air is inducted into a cylinder, fuel may be added to the air and a spark introduced to produce power on that event. The burned gasses can then be exhausted into the adjacent exhaust manifold. On other engine cycles when air is inducted, fuel may not be added and no combustion takes place. The fresh air can then be exhausted into the adjacent exhaust manifold. On other cycles, the intake and exhaust valves may be deactivated so that no air is inducted or exhausted.

Each cylinder includes variable intake valve operators 59 and variable exhaust valve operators 58. An engine cylinder may be deactivated by its variable intake valve operators 59 and variable exhaust valve operators holding intake and exhaust valves of the cylinder closed during an entire cycle of the cylinder. An engine cylinder may be activated by its variable intake valve operators 59 and variable exhaust valve operators 58 opening and closing intake and exhaust valves of the cylinder during a cycle of the cylinder. Engine 10 includes a first cylinder bank 304, which includes four cylinders 1, 2, 3, and 4. Engine 10 also includes a second cylinder bank 302, which includes four cylinders 5, 6, 7, and 8. Cylinders of each bank may be active or deactivated during a cycle of the engine.

Referring now to FIG. 3B, an example multi-cylinder engine 10 showing deactivating intake and exhaust valves actuators is shown. The engine includes cylinders and associated components as shown in FIG. 1. Engine 10 includes four cylinders 310. Each of the four cylinders is numbered and the numbers of the cylinders are included within the cylinders. Fuel injectors 66 selectively supply fuel to each of the cylinders that are activated (e.g., combusting fuel during a cycle of the engine with intake and exhaust valves opening and closing during a cycle of the cylinder that is active).

Engine 10 may also include deactivating valve actuators 58 and 59. The deactivating valve actuators make it possible to control whether air is inducted into each individual cylinder on a cycle by cycle basis. During some engine cycles when air is inducted into a cylinder, fuel may be added to the air and a spark introduced to produce power on that event. The burned gasses can then be exhausted into the adjacent exhaust manifold. On other engine cycles when air is inducted, fuel may not be added and no combustion takes place. The fresh air can then be exhausted into the adjacent exhaust manifold. On other cycles, the intake and exhaust valves may be deactivated so that no air is inducted or exhausted.

Cylinders 1-4 may be selectively deactivated (e.g., not combusting fuel during a cycle of the engine with intake and exhaust valves held closed over an entire cycle of the cylinder being deactivated) to improve engine fuel economy when less than the engine's full torque capacity is requested. For example, cylinders 2 and 3 (e.g., a fixed pattern of deactivated cylinders) may be deactivated during a plurality of engine cycles (e.g., two revolutions for a four stroke engine). During a different engine cycle, a second fixed pattern cylinders 1 and 4 may be deactivated over a plurality of engine cycles. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. In this way, the deactivated engine cylinders may rotate or change from one engine cycle to the next engine cycle.

Engine 10 includes a single cylinder bank 350, which includes four cylinders 1-4. Cylinders of the single bank may be active or deactivated during a cycle of the engine. Each cylinder includes variable intake valve operators 59 and variable exhaust valve operators 58. An engine cylinder may be deactivated by its variable intake valve operators 59 and variable exhaust valve operators 58 holding intake and exhaust valves of the cylinder closed during a cycle of the cylinder. An engine cylinder may be activated by its variable intake valve operators 59 and variable exhaust valve operators 58 opening and closing intake and exhaust valves of the cylinder during a cycle of the cylinder.

Thus, the systems of FIGS. 1-3B provides for a system, comprising: an engine; an electric machine coupled to the engine; a transmission couple to the electric machine; and a vehicle system controller including executable instructions stored in non-transitory memory to operate engine cylinders with opening and closing valves and without fuel in response to a torque capacity of the electric machine being less than a desired driveline braking torque, and instructions stored in non-transitory memory to operate engine cylinders with closed valves over a plurality of engine cycles and without fuel in response to the torque capacity of the electric machine being greater than the desired driveline braking torque. The system further comprises a driveline disconnect clutch between the engine and the electric machine. The system includes where the step ratio transmission is a dual clutch transmission. The system further comprises additional instructions to determine if a speed of a vehicle is outside of a range of vehicle speed. In other examples, the engine may be coupled to a planetary gear set, the planetary gear set coupled to a generator. The generator may be coupled to a gearbox along with a motor. The gearbox may be coupled to vehicle wheels.

Figure 4:
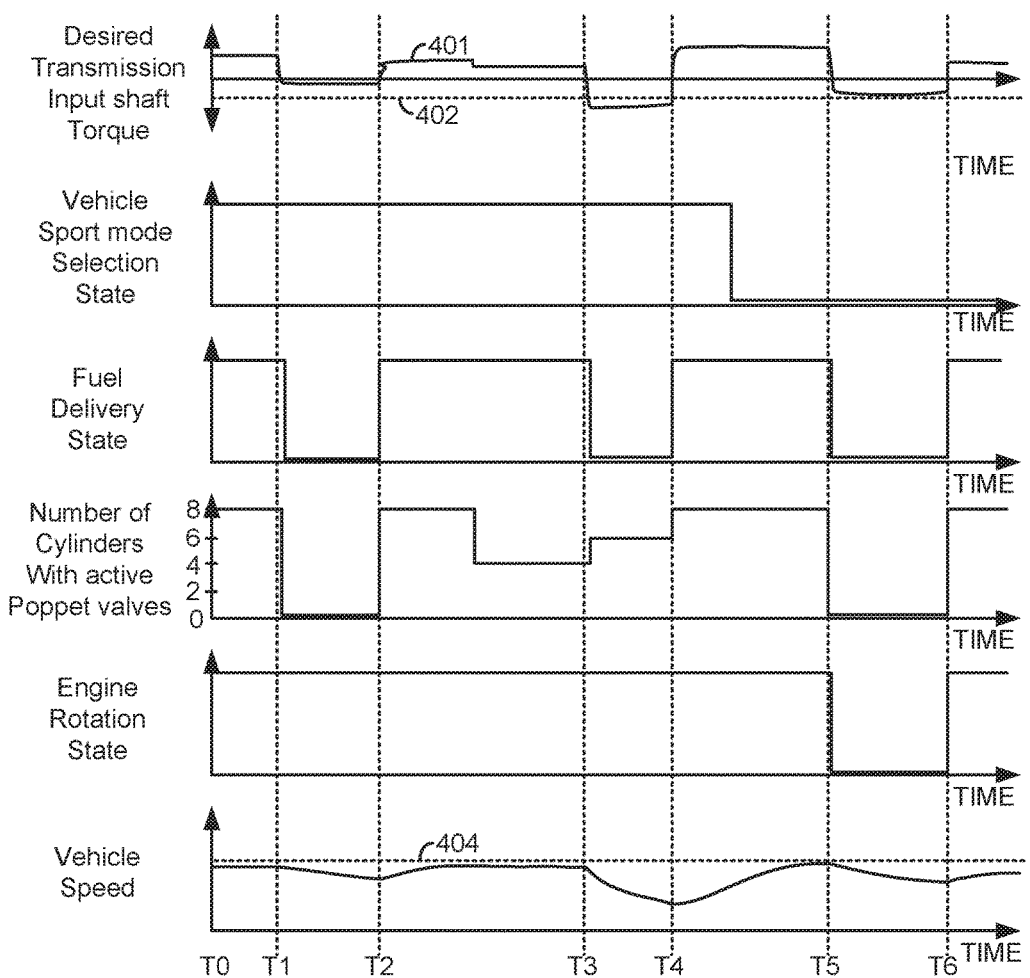
FIG. 4 shows an example hybrid vehicle operating sequence.

Referring now to FIG. 4, a hybrid driveline operating sequence is shown. The sequence of FIG. 4 may be provided according to the method of FIG. 5 along with or in conjunction with the system of FIGS. 1-3B. The plots shown in FIG. 4 occur at the same time and are aligned in time.

The first plot from the top of FIG. 4 is a plot of desired transmission input shaft torque versus time. The vertical axis represents desired transmission input shaft torque. The desired transmission input shaft torque is zero at the vertical level that corresponds to the horizontal axis. Desired transmission shaft torque is positive and it increases in the direction of the vertical axis arrow pointing upward. Desired transmission shaft torque is negative and its magnitude increases in the direction of the vertical axis arrow pointing downward. The horizontal axis represents time and time increases from the left side of the figure to the right side of the figure. Horizontal line 402 represents a negative torque capacity of a motor in the driveline (e.g., 240 of FIGS. 2A and 2B) during the present vehicle operating conditions. The motor has no capacity to provide negative torques with magnitude greater than (e.g., desired transmission input torque traces below horizontal line 402) at horizontal line 402.

The second plot from the top of FIG. 4 is a plot of a state of vehicle sport operating mode versus time. The vehicle is in a sport operating mode when the trace is at a higher level near the vertical axis arrow. The vehicle is not in a sport operating mode when the trace is at a lower level near the horizontal axis. Several vehicle operating parameters may be changed when entering and exiting sport operating mode. For example, in sport mode vehicle suspension characteristics may be changed. In particular, a damping of the vehicle's suspension may be adjusted to over damp (e.g., stiffen) in response to entering sport mode from a nominal vehicle operating mode. On the other hand, in a touring or a nominal suspension mode, the vehicle's dampeners may be adjusted to under damp the vehicle suspension. Sport mode may also include driveline adjustments such as shifting transmission gears at higher vehicle speeds as compared to when the vehicle is not in a sport mode. Also, engine spark timing may be advanced and an accelerator pedal transfer function that converts accelerator pedal position into driver demand torque may increase engine torque at smaller accelerator pedal depression amounts than when the vehicle is not operated in a sport mode. Further, valve timing may be adjusted when entering sport mode from touring mode. Thus, vehicle performance may be increased upon entering sport mode as compared to when operating in other vehicle modes.

The third plot from the top of FIG. 4 is a plot of engine fuel delivery state versus time. The vertical axis represents engine fuel delivery state and fuel is being delivered to the engine when the trace is at a higher level near the vertical axis arrow. Fuel is not being delivered to the engine when the trace is at a lower level near the horizontal axis.

The fourth plot from the top of FIG. 4 is a plot of the number of engine cylinders with active poppet valves versus time. Cylinder poppet valves are active when they open and close during a cycle of the engine. The vertical axis represents the actual total number of engine cylinders having active poppet valves and the actual total number of active poppet valves is displayed along the vertical axis. The horizontal axis time and time increases from the left side of the figure to the right side of the figure.

The fifth plot from the top of FIG. 4 is a plot of engine rotation state versus time. The vertical axis represents engine rotation state and the engine is rotating when the trace is at a higher level near the vertical axis arrow. The engine is not rotating and is stopped when the trace is near the horizontal axis. The horizontal axis represents time and time increases from the left side of the figure to the right side of the figure.

The sixth plot from the top of FIG. 4 is a plot of vehicle speed versus time. The vertical axis represents vehicle speed and vehicle speed increases in the direction of the vertical axis arrow. The horizontal axis represents time and time increases from the left side of the figure to the right side of the figure. Horizontal line 404 represents a vehicle speed above which the vehicle's engine is not permitted to stop rotating.

At time T0, the vehicle is at a middle level speed below threshold speed 504 and the desired transmission input torque is positive. The vehicle is in a sport mode and fuel is being supplied to the engine. The engine is operating with eight cylinders having active poppet valves that allow air into the cylinders and combustion byproducts out of the engine cylinders. The engine is also rotating.

At time T1, the desired transmission input shaft torque transitions from a positive torque to a negative torque in response to a reduction in driver demand torque (not shown). The desired transmission input shaft torque is a small negative value that is within the capability of the motor to provide as indicated by trace 501 being above horizontal line 502. The vehicle remains in sport mode and vehicle speed is less than threshold 504. Combustion in engine cylinders is not desired so that fuel economy may be improved. The judgement that combustion is not desired may be based on vehicle speed and the low driver demand torque. Fuel delivery to the engine is ceased to suspend combustion in engine cylinders shortly after the driver demand torque is reduced and the actual total number of cylinders with active poppet valves decreases from eight to zero. The engine continues to rotate. Thus, ceasing combustion in an engine, rotation of the engine, and decreasing an actual total number of cylinders with active poppet valves is provided in response to the negative transmission input torque request and the vehicle being in a sport mode.

At time T2, the desired transmission input shaft torque transitions from a negative value to a positive value in response to an increase in driver demand torque (not shown). Combustion in the engine is reinitiated by activating fuel delivery to the engine as indicated by the fuel delivery state transitioning to a higher level. The actual total number of cylinders with activated poppet valves also increases from zero to eight so that combustion may be reinitiated in engine cylinders. Since the engine remained rotating, the engine is started quickly without having to crank the engine over. The vehicle speed begins to increase in response to the desired transmission input shaft torque increasing and reactivating combustion in the engine. The vehicle remains in a sport mode. After the vehicle reaches a steady speed, the torque required to maintain speed may be reduced. The desired transmission input shaft torque reduces and the number of active cylinders reduces from eight to four between time T2 and time T3.

At time T3, the desired transmission input shaft torque transitions again from a positive torque to a negative torque in response to a reduction in driver demand torque (not shown). The desired transmission input shaft torque is a large negative value that is not within the capability of the motor to provide as indicated by trace 501 being below horizontal line 502. The vehicle remains in sport mode and vehicle speed is less than threshold 504. Combustion in engine cylinders is not desired so that fuel economy may be improved. Fuel delivery to the engine is ceased to suspend combustion in engine cylinders shortly after the driver demand torque is reduced and the actual total number of cylinders with active poppet valves increases from four to six. The total number of active cylinders with active poppet valves increases by only two cylinders because the engine may provide increased braking torque when engine cylinders are operated with activated poppet valves because engine pumping losses are increased as compared to if the engine is rotated with all engine cylinder poppet valves deactivated and held in a closed position as the engine rotates. Thus, to increase the driveline negative braking, two engine cylinders are operated with active poppet valves while fuel flow to the engine is ceased and the engine continues to rotate as indicated by the engine rotation state. In this way, ceasing combustion in an engine, rotation of the engine, operating some cylinders with active poppet valves, and operating some cylinders with deactivated poppet valves as shown is provided in response to the negative transmission input torque request and the vehicle being in a sport mode.

At time T4, the desired transmission input shaft torque transitions from a negative value to a positive value in response to an increase in driver demand torque (not shown). Combustion in the engine is reinitiated by activating fuel delivery to the engine as indicated by the fuel delivery state transitioning to a higher level. The actual total number of cylinders with activated poppet valves also increases from six to eight so that combustion may be reinitiated in engine cylinders. Since the engine remained rotating, the engine is started quickly without having to crank the engine over. The vehicle speed begins to increase in response to the desired transmission input shaft torque increasing and reactivating combustion in the engine. The vehicle remains in a sport mode.

Between time T4 and time T5, the human driver transitions the vehicle from sport mode to a nominal (e.g., touring) mode to reduce vehicle performance. By reducing vehicle performance, it may be possible to improve vehicle fuel economy and vehicle ride quality over rougher roads. The vehicle transitions from sport mode to a nominal mode as indicated by the vehicle sport mode selection state.

At time T5, the desired transmission input shaft torque transitions again from a positive torque to a negative torque in response to a reduction in driver demand torque (not shown). The desired transmission input shaft torque is a negative value that is within the capability of the motor to provide as indicated by trace 501 being above horizontal line 502. The vehicle remains out of sport mode and vehicle speed is less than threshold 504. Combustion in engine cylinders is not desired so that fuel economy may be improved. Fuel delivery to the engine is ceased to suspend combustion in engine cylinders shortly after the driver demand torque is reduced and the actual total number of cylinders with active poppet valves decreases from eight to zero. However, during this low driver demand torque period, engine rotation ceases. By ceasing engine rotation and deactivating cylinder poppet valves in a closed state, sending fresh air to the engine catalyst may be avoided so that the catalyst may remain in an efficient operating state. Thus, ceasing combustion in an engine, stopping rotation of the engine, and ceasing poppet valve operation in engine cylinders is provided in response to the negative transmission input torque request and the vehicle not being in a sport mode.

At time T6, the desired transmission input shaft torque transitions from a negative value to a positive value in response to an increase in driver demand torque (not shown). Combustion in the engine is reinitiated by activating fuel delivery to the engine as indicated by the fuel delivery state transitioning to a higher level. The actual total number of cylinders with activated poppet valves also increases from zero to eight so that combustion may be reinitiated in engine cylinders. Since the engine was stopped from rotating, engine starting time may increase but fuel consumption may be reduced. The vehicle speed begins to increase in response to the desired transmission input shaft torque increasing and reactivating combustion in the engine. The vehicle remains out of sport mode.

In this way, a driveline may transition between different fuel delivery states, cylinder deactivation modes, and engine rotation states in response to a desired transmission input shaft torque, vehicle speed, and vehicle mode selection. Further, the total number of cylinders with active poppet valves may be determined based on the requested transmission input shaft torque and the capacity of a motor in the driveline to provide the requested transmission input shaft torque.

Figure 5:
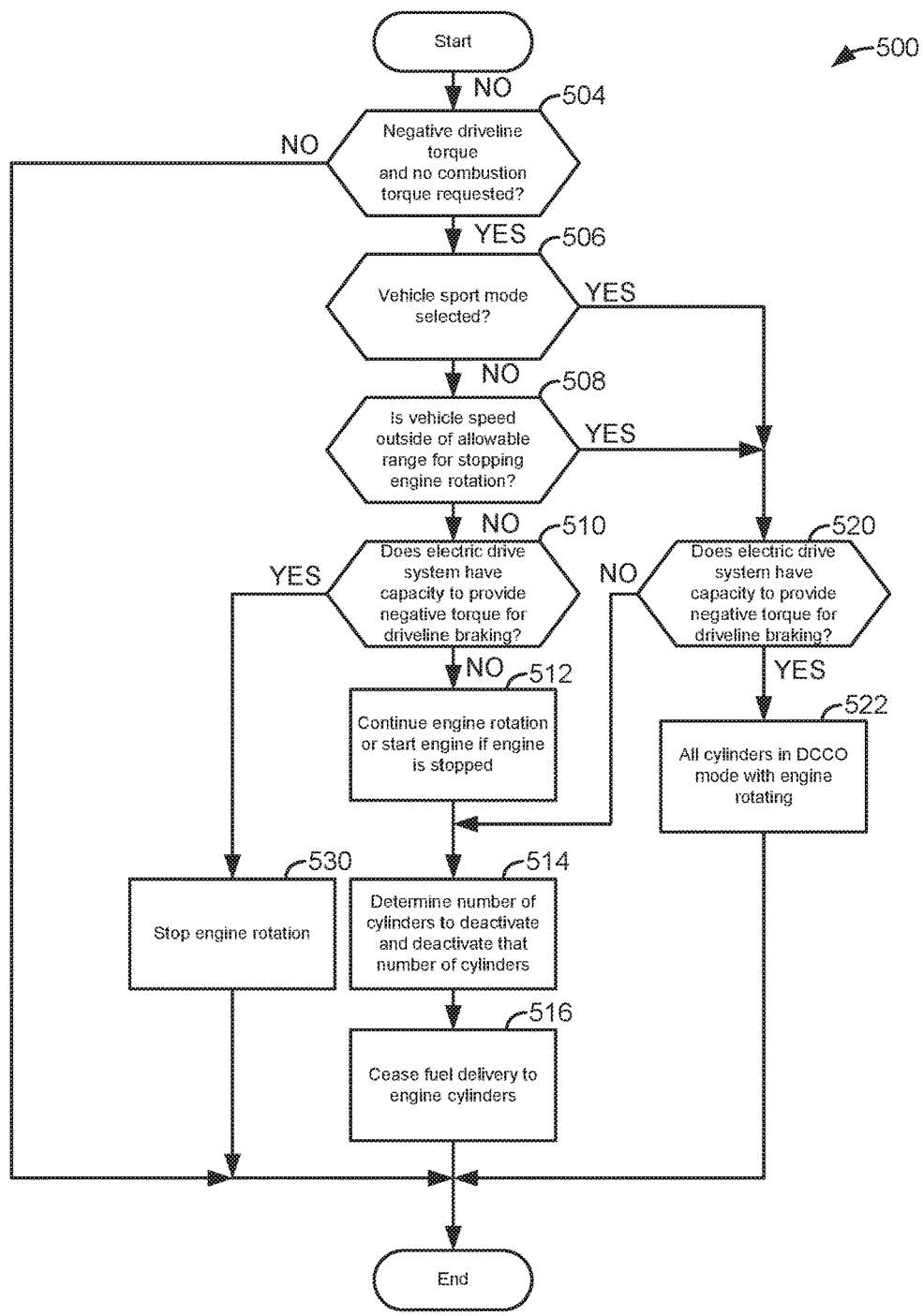
FIG. 5 shows an example method for operating a hybrid vehicle.

Referring now to FIG. 5, a method for operating a hybrid vehicle is disclosed. The method of FIG. 5 may be incorporated into the system of FIGS. 1-3B as executable instructions stored in non-transitory memory. Additionally, portions of the method of FIG. 5 may be actions performed via the controller 12 shown in FIGS. 1, 2A, 2B, and 2C to transform a state of a device or actuator in the real world.

At 504, method 500 judges if a negative driveline torque is requested and engine combustion is not requested. Engine combustion may not be requested and negative driveline torque may be requested when a vehicle is traveling at a threshold speed and driver demand torque or demanded wheel torque is less than a threshold. By requesting a negative driveline torque, the driveline may provide braking to reduce vehicle speed. Further, by ceasing combustion in the engine, vehicle fuel consumption may be reduced. If method 500 judges that a negative driveline torque is requested and engine combustion is not requested, the answer is yes and method 500 proceeds to 506. Otherwise, the answer is no and method 500 proceeds to exit.

At 506, method 500 judges whether or not the vehicle is in a sport mode. If the vehicle is in a sport mode, vehicle operating parameters may be adjusted to improve vehicle performance as previously described. Method 500 may judge that the vehicle is in sport mode based on a state of a byte or word in memory. If method 500 judges that the vehicle is in a sport mode, the answer is yes and method 500 proceeds to 520. Otherwise, the answer is no and method 500 proceeds to 508.

At 508, method 500 judges if vehicle speed the vehicle is outside of a range where stopping engine rotation is permitted. In one example, method 500 determines the vehicle is outside of a speed range where engine rotation may be stopped if vehicle speed is greater than a threshold speed. If method 500 judges that the vehicle is outside a speed range where engine rotation may be stopped, the answer is yes and method 500 proceeds to 520. Otherwise, the answer is no and method 500 proceeds to 510.

At 510, method 500 judges whether or not an electric machine in the vehicle driveline has capacity according to the present vehicle operating conditions including battery state of charge to provide a desired negative driveline torque for driveline braking. In one example, method 500 determines the electric machine's capacity to provide a driveline braking torque that decelerates the vehicle at a desired rate. If method 500 judges that the electric machine has torque capacity to provide the desired level of driveline braking, the answer is yes and method 500 proceeds to 530. Otherwise, the answer is no and method 500 proceeds to 512.

At 512, method 500 continues engine rotation by maintaining the engine coupled to the driveline and the vehicle wheels. For example, the TCC may remain closed and transmission clutches may be closed to maintain a connection between the engine and the wheels. However, if the engine is stopped rotating, the engine is restarted. Method 500 proceeds to 514.

At 514, method 500 determines an actual total number of engine cylinders to deactivate with poppet valves in a closed position while the engine rotates through an engine cycle. By deactivating engine cylinders with the cylinder's poppet valves closed, engine pumping work may be reduced so that driveline braking may be lower while the engine rotates. In one example, method 500 determines a negative amount of torque the engine may produce via deactivating one or more engine cylinders with intake and exhaust poppet valves held closed over a cylinder cycle. The negative amount of torque produced by a cylinder when its intake and exhaust poppet valves are held closed without combustion in the cylinder may be empirically determined and stored in controller memory via a table or function that is indexed via engine speed and engine temperature. Alternatively, engine speed and temperature may be inputs into an empirically determined function that outputs a negative amount of torque generated by a cylinder that is not combusting air and fuel during an engine cycle, the cylinder also having its intake and exhaust poppet valves held closed over a cycle of the engine or cylinder (e.g. deceleration cylinder cut-out (DCCO) cylinder mode).

Method 500 also determines an amount of negative torque that a cylinder produces over an engine cycle if combustion is ceased in the cylinder and the cylinder's intake and exhaust poppet valves open and close during a cycle of the cylinder or the engine (e.g., deceleration fuel shut-off (DFSO) cylinder mode). The negative amount of torque produced by a cylinder when its intake and exhaust poppet valves are opened and closed without combustion in the cylinder may be empirically determined and stored in controller memory via a table or function that is indexed via engine speed and engine temperature. Alternatively, engine speed and temperature may be inputs into an empirically determined function that outputs a negative amount of torque generated by a cylinder that is not combusting air and fuel with operating poppet valves during an engine cycle (e.g. DFSO cylinder mode).

Method 500 then selects an actual total number of engine cylinders to operate in DCCO mode and an actual total number of cylinders to operate in DFSO mode to provide the requested driveline braking torque determined at 510. Method 500 selects cylinders to operate in DFSO mode and DCCO mode based on the ability of the engine to provide a braking torque nearest the desired braking torque. In one example, method 500 first determines engine braking torque if all engine cylinders are in DCCO mode. If requested engine braking torque is less than or equal to engine braking torque produced when operating all engine cylinders in DCCO mode, all engine cylinders are placed in DCCO mode. If requested engine braking torque is greater than the engine braking torque if all engine cylinders are in DCCO mode, engine braking torque is increased by increasing the number of engine cylinders in DFSO mode until all engine cylinders are in DFSO mode or an engine braking torque greater than the requested engine braking torque is provided. For example, if 36 N-m of engine braking torque is requested and engine cylinders provide 3 N-m of braking torque when operated in DCCO mode without combustion and 5 N-m of braking torque when operated in DFSO mode without combustion, method 500 first determines that the engine may provide 8*3=24 N-m of braking torque if all eight engine cylinders are operated in DCCO mode. Since 24 N-m of engine braking torque is less than 36 N-m of braking torque, method 600 increases the actual total number of engine cylinders operating in DFSO mode to one which provides (7*3)+(1*5)=26 N-m of braking torque. The number of engine cylinders operating in DFSO is increased until the actual total number of engine cylinders in DFSO mode is equal to six, the remaining two cylinders of the eight cylinder engine remain in DCCO mode. In this way, the actual total number of engine cylinders in DCCO mode and the actual total number of engine cylinders in DFSO mode may be determined. Method 500 proceeds to 516.

At 516, method 500 ceases fuel delivery to the cylinders to be operated in DCCO mode and the cylinders to be operated in DFSO mode. In addition, method 500 deactivates poppet valves in cylinders operating in DCCO mode so that intake and exhaust poppet valves remain closed during a cylinder or engine cycle. Each of all the engine cylinders is operated in DCCO mode or DFSO mode. The actual total number of engine cylinders operated in DCCO mode is as determined at 514. The actual total number of engine cylinders operated in DFSO mode is as determined at 514. The engine continues to rotate via vehicle wheels delivering kinetic energy to the engine so that if additional engine torque is requested, the engine cylinders may be activated to begin combusting air and fuel quickly without accelerating the engine from zero rotational speed. Method 500 proceeds to exit.

At 530, method 500 stops engine rotation. Engine rotation is ceased via ceasing fuel flow to the engine and decoupling the engine from the vehicle wheels. The engine may be decoupled from the vehicle wheels via transmission clutches. Method 500 proceeds to exit.

At 520, method 600 judges whether or not an electric machine in the vehicle driveline has capacity according to the present vehicle operating conditions including battery state of charge to provide a desired negative driveline torque for driveline braking. In one example, method 500 determines the electric machine's capacity to provide a driveline braking torque that decelerates the vehicle at a desired rate. If method 500 judges that the electric machine has torque capacity to provide the desired level of driveline braking, the answer is yes and method 500 proceeds to 522. Otherwise, the answer is no and method 500 proceeds to 514.

At 522, method 500 ceases fuel delivery to all engine cylinders and deactivates intake and exhaust valves in a closed state so that the valves stay closed over an engine or cylinder cycle. The engine continues to rotate via delivering kinetic energy from vehicle wheels to the engine so that if additional engine torque is requested, the engine cylinders may be activated to begin combusting air and fuel quickly without accelerating the engine from zero rotational speed. Thus, the engine cylinders may be reactivated quickly to improve engine response time due to a change in engine torque when one or more engine cylinders is not combusting air and fuel.

Thus, the method of FIG. 5 provides for a driveline operating method, comprising: ceasing fuel delivery to all engine cylinders and adjusting an actual total number of cylinders of an engine with operating poppet valves and an actual total number of cylinders of the engine with deactivated poppet valves in response to a desired driveline braking torque during vehicle deceleration via a controller.

The method further comprises rotating the engine in response to the desired driveline braking torque. The method includes where the poppet valves include intake and exhaust valves and further comprising: rotating the engine via energy supplied via vehicle wheels while fuel delivery is ceased. The method further comprises ceasing to rotate the engine in response to a vehicle in which the engine operates not being in a sport mode and an electric machine having torque capacity to provide the desired driveline braking torque. The method further comprises further comprising starting the engine to rotate the engine in response to the desired driveline braking torque and insufficient negative torque capacity of an electric machine to provide the desired driveline braking torque.

The method of FIG. 5 also provides for a driveline operating method, comprising: rotating an engine and holding poppet valves of a cylinder of the engine closed over a first engine cycle in response to a vehicle operating in a sport mode and an electric machine having torque capacity to provide a desired driveline braking torque; and stopping engine rotation in response to the vehicle not operating in the sport mode and the electric machine having torque capacity to provide the desired driveline braking torque. The method includes where sport mode improves performance of the vehicle (e.g., engine power output may be increased via advancing spark timing for engine operating conditions). The method further comprises operating a first actual total number of cylinders of the engine with poppet valves of the first actual total number of cylinders held closed over a second engine cycle and operating a second actual total number of cylinders with poppet valves of the second actual total number of cylinders opening and closing during the second engine cycle in response to the vehicle being in the sport mode and the electric machine not having torque capacity to provide the desired driveline braking torque.

The method further comprises ceasing combustion in the engine while the engine rotates. The method includes where the engine continues to rotate via energy supplied from the vehicle's wheels to the engine. The method includes where engine rotation is stopped via decoupling the engine from vehicle wheels and ceasing combustion within the engine. The method further comprises ceasing to supply fuel to the engine in response to the vehicle operating in the sport mode and the electric machine having torque capacity to provide the desired driveline braking torque. The method further comprises operating a portion of engine cylinders with intake and exhaust valves opening and closing over an engine cycle in response to the electric machine having insufficient torque capacity to provide the desired driveline braking torque.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
   ceasing fuel delivery to all engine cylinders and adjusting an actual total number of engine cylinders with operating poppet valves and an actual total number of engine cylinders with deactivated poppet valves in response to a driveline braking torque during vehicle deceleration via a controller; and
   ceasing to rotate an engine in response to a vehicle in which the engine operates not being in a sport mode and an electric machine having torque capacity to provide the driveline braking torque.

2. The method of claim 1, where the poppet valves include intake and exhaust valves, and further comprising:
   rotating the engine via energy supplied via vehicle wheels while fuel delivery is ceased.

3. The method of claim 1, where the driveline braking torque is a negative driveline braking torque.

4. The method of claim 1, further comprising rotating the engine in response to the driveline braking torque.

5. The method of claim 4, further comprising starting the engine to rotate the engine in response to the driveline braking torque and a lack of negative torque capacity of the electric machine to provide the driveline braking torque.

6. A driveline operating method, comprising:
   rotating an engine and holding poppet valves of a cylinder of the engine closed over a first engine cycle in response to a vehicle operating in a sport mode and an electric machine having torque capacity to provide a driveline braking torque; and
   stopping engine rotation in response to the vehicle not operating in the sport mode and the electric machine having torque capacity to provide the driveline braking torque.

7. The method of claim 6, further comprising operating a first actual total number of cylinders of the engine with poppet valves of the first actual total number of cylinders held closed over a second engine cycle and operating a second actual total number of cylinders with poppet valves of the second actual total number of cylinders opening and closing during the second engine cycle in response to the vehicle being in the sport mode and the electric machine not having torque capacity to provide the driveline braking torque.

8. The method of claim 6, where the sport mode increases performance of the vehicle.

9. The method of claim 6, further comprising ceasing to supply fuel to the engine in response to the vehicle operating in the sport mode and the electric machine having torque capacity to provide the driveline braking torque.

10. The method of claim 6, further comprising ceasing combustion in the engine while the engine rotates.

11. The method of claim 10, where the engine continues to rotate via energy supplied from a vehicle's wheels to the engine.

12. The method of claim 6, where engine rotation is stopped via decoupling the engine from vehicle wheels and ceasing combustion within the engine.

13. The method of claim 6, further comprising operating a portion of engine cylinders with intake and exhaust valves opening and closing over an engine cycle in response to the electric machine having insufficient torque capacity to provide the driveline braking torque.

14. A driveline operating method, comprising:
ceasing fuel delivery to all engine cylinders and adjusting an actual total number of engine cylinders with operating poppet valves and an actual total number of engine cylinders with deactivated poppet valves in response to a driveline braking torque during vehicle deceleration via a controller;
rotating an engine in response to the driveline braking torque; and
starting the engine to rotate the engine in response to the driveline braking torque and a lack of negative torque capacity of an electric machine to provide the driveline braking torque.

15. The method of claim 14, where the poppet valves include intake and exhaust valves.

16. The method of claim 14, where the driveline braking torque is a negative driveline braking torque.

* * * * *